United States Patent [19]

Marlett et al.

[11] Patent Number: 4,757,154
[45] Date of Patent: Jul. 12, 1988

[54] PREPARATION OF SILANE AND AMINE ALANES

[75] Inventors: Everett M. Marlett; Frederick W. Frey, both of Baton Rouge, La.

[73] Assignee: Ethyl Corporation, Richmond, Va.

[21] Appl. No.: 926,662

[22] Filed: Nov. 4, 1986

[51] Int. Cl.$^4$ ................................................ C07F 5/06
[52] U.S. Cl. ................................... 556/176; 423/347; 423/489
[58] Field of Search ......................... 423/347; 556/176

[56] References Cited

U.S. PATENT DOCUMENTS

| | | | |
|---|---|---|---|
| 2,680,059 | 6/1954 | Bragdon | 23/14 |
| 3,159,626 | 12/1964 | Ashby | 260/242 |
| 3,541,125 | 11/1970 | Sims | 260/448 |
| 3,642,853 | 2/1972 | Murib et al. | 556/170 X |
| 3,764,666 | 10/1973 | Murib | 556/170 X |
| 3,926,833 | 12/1975 | Hoffman et al. | 252/188 |
| 4,006,095 | 2/1977 | Hoffman et al. | 252/188 |
| 4,474,743 | 10/1984 | Marlett | 423/347 |
| 4,542,005 | 9/1985 | Tetsuya et al. | 423/347 |
| 4,632,816 | 12/1986 | Marlett | 423/347 |
| 4,665,207 | 5/1987 | Marlett | 556/176 |

FOREIGN PATENT DOCUMENTS

| | | | |
|---|---|---|---|
| 0823496 | 11/1959 | United Kingdom | 423/347 |
| 0851962 | 10/1960 | United Kingdom | 423/347 |

OTHER PUBLICATIONS

Ehrlich et al., *Inorg. Chem.* 5, p. 1284 (1966).
Dilts et al., *Inorg. Chem.* 9, 855 (1970).
Fergusson et al., *J. Chem. Soc.* (1959), p. 99.
Padma, *J. of Fluorine Chemistry* (1979), 14, pp. 327–329.
Ruff et al., The Amine Complexes of Aluminum Hydride, *J. Am. Chem. Soc.*, 82, 2141 (1960).
Lewis et al., *J. Electrochem. Soc.*, vol. 108, No. 12, pp. 1114.
Paddock, *Nature*, 167, 1070 (1951).

*Primary Examiner*—Paul F. Shaver
*Attorney, Agent, or Firm*—John F. Sieberth; Robert A. Linn

[57] ABSTRACT

Process for the preparation of silane and a tertiary amine alane, said process comprising reacting:
 (a) an alkali metal aluminum tetrahydride having the formula MAlH$_4$, wherein M is an alkali metal selected from the class consisting of lithium, sodium and potassium,
 (b) silicon tetrachloride, and
 (c) a complexing tertiary amine, such that the molar proportion of (a) to (b) to (c) is about 4:1:4.

In this process, NaAlH$_4$ and triethylamine are preferred reactants. The amine alane product can be reacted with additional silicon halide to prepare additional silane. This step can be conducted utilizing amine alane in the reaction mixture produced by the process above, and is preferably conducted using SiF$_4$ as the silicon tetrahalide to produce AlF$_3$ as a co-product. Both AlF$_3$ and silane are valuable articles of commerce.

14 Claims, No Drawings

PREPARATION OF SILANE AND AMINE ALANES

BACKGROUND OF THE INVENTION (1) Field of the Invention

This invention relates to the preparation of silane, $SiH_4$. This gas is a useful chemical intermediate. It has important and growing usage in the production of electronic equipment and devices. The invention also pertains to the formation of amine alanes, $AlH_3.NR_3$. These materials, which are stabilized forms of $AlH_3$, are also useful as chemical intermediates. For example, they can be reacted with a silicon halide such as $SiCl_4$ or $SiF_4$ to produce additional silane.

(2) Related Art

Reference is made to U.S. Pat. No. 4,474,743. It pertains to production of silane and aluminum fluoride from silicon tetrafluoride and amine alanes. Reference is also made to U.S. Pat. No. 4,006,095. It teaches, inter alia, that $SiCl_4$ reacts with an amine solution of $AlH_3$.

U.S. Pat. No. 4,474,743, cited above, contains a citation to U.S. Pat. No. 4,006,905. It also sets forth other prior art relating to amine alane production. For example, it sets forth the following general methods for preparing amine alanes:

  (1)

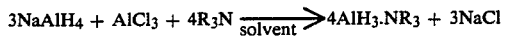  (2)

  (3)

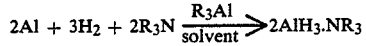  (4)

U.S. Pat. No. 4,474,743 also states that:

"Alane, that is aluminum trihydride or $AlH_3$, has in the past been produced from the reaction of $LiAlH_4$ and $AlCl_3$ in ethers. Also known is the production of an alane dimethyl ether solution from the reaction of LiH and $AlCl_3$ in dimethyl ether, catalyzed by $NaAlH_4$.

Amines are used to produce amine alanes for subsequent syntheses. For example, $LiAlH_4$ can be reacted with a trialkyl amine.HCl complex to precipitate LiCl and form $AlH_3.NR_3$ where R is alkyl."

It is known in the art that lithium aluminum hydride reacts with silicon tetrachloride. This process is set forth in Kelly, British Pat. No. 823,496. In that reference the reaction is depicted by the following equation:

  (5)

Allied, British 851,962 sets forth the analogous equation:

(6)

Padma, D.K. et al., *Journal of Fluorine Chemistry*, 1979, Volume 14, pages 327–329, teaches that $SiF_4$ reacts with $LiAlH_4$ to form silane. The by-product(s) of the reaction were not described in the reference.

CROSS REFERENCE TO RELATED APPLICATIONS

Application Ser. No. 701,947, filed Feb. 15, 1985, teaches that silane and a fluorine-aluminum co-product can be obtained by reacting $SiF_4$ and $NaAlH_4$:

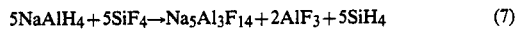  (7)

Furthermore, Application Ser. No. 782,972, filed Oct. 2, 1985, now U.S. Pat. No. 4,665,207 teaches formation of amine alane complexes by reacting (a) an alkali metal aluminum hydride with (b) an alkali metal aluminum tetrachloride or tetrabromide, and (c) a complexing tertiary amine.

SUMMARY OF THE INVENTION

This invention comprises a process in which silane and an amine alane are formed by reacting: (i) silicon tetrachloride, and (ii) a complexing tertiary amine with (iii) an alkali metal aluminum hydride, $MAlH_4$, wherein M is Li, Na or K. This process can be conducted in one or two steps. Without being bound by any theory, it is believed the one-step process can be illustrated by equation (8) below, wherein the metal hydride is sodium aluminum tetrahydride, and the amine is triethylamine ($Et_3N$). Without being bound by any theory, it is also believed that the two-step process can be illustrated by reaction sequence (9) below; the two steps being illustrated by the first two equations, and the overall result being illustrated by the third equation--which is identical to equation (8).

As stated above, silane is an important product. It is useful in the production of semiconductor devices. The amine alanes produced by this invention can be reacted to form additional silane. Thus, this invention comprises a sequential method for preparing silane. This sequential method is illustrated by reaction sequence (10) below. (Sequence (10) is for illustration purposes; it is not to be taken by implication or otherwise, as an indication that applicants wish to be bound by any theory.) In sequence (10), the first equation illustrates a process of this invention for making silane and an amine alane co-product. The first equation is the same as equation (8) supra. The second equation in sequence (10) illustrates a process of U.S. Pat. No. 4,474,743; cited above. (That patent was issued in the name of one of the co-inventors of this invention, and has a common assignee.) The third equation in (10) sets forth the overall result obtained by conducting the two reactions in sequence

DESCRIPTION OF PREFERRED EMBODIMENTS

This invention pertains to the preparation of silane and a tertiary amine complex of aluminum trihydride. Thus, this invention comprises a process for the preparation of silane and a tertiary amine alane, said process comprising reacting:
(a) an alkali metal aluminum tetrahydride having the formula $MAlH_4$, wherein M is an alkali metal selected from the class consisting of lithium, sodium and potassium,
(b) silicon tetrachloride, and
(c) a complexing tertiary amine, such that the molar proportion of (a) to (b) to (c) is about 4:1:4.

Without being bound by any theory, it is believed this process can be illustrated by the following equation, in which sodium aluminum tetrahydride and triethylamine are reacted with silicon tetrachloride.

$$4NaAlH_4 + SiCl_4 + 4(C_2H_5)_3N \rightarrow SiH_4 + 4AlH_3 \cdot N(C_2H_5)_3 + 4NaCl \quad (8)$$

This process is preferably conducted in the presence of a liquid reaction medium. Excess tertiary amine, hydrocarbons, and ethers are examples of suitable liquid media. Toluene and dimethoxyethane (DME) are specific examples. The process of this invention can be conducted in one or two steps. The one-step process is illustrated by equation (8) supra. The two-step process is illustrated by the first two equations in sequence (9) below. The third equation in sequence (9) portrays the overall result of the two steps; it is identical to equation (8).

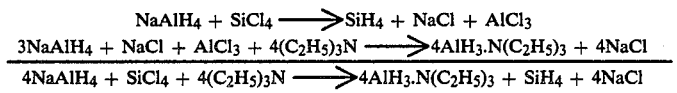

(9)

Thus, this invention comprises a two-step process in which silane is produced in a first step and an amine alane is produced in a second step, said process comprising:
  (i) reacting substantially equimolar quantities of SiCl$_4$ and an alkali metal aluminum hydride MAlH$_4$, wherein M has the same significance as above, to produce silane and a residual mixture, and
  (ii) reacting said residual mixture with about 4 mole portions of a complexing tertiary amine and about 3 moles of MAlH$_4$ to produce about 4 moles of an amine alane.

In the process of sequence (9), better results are usually obtained if the first reaction in the sequence is conducted in the presence of an ether reaction medium. The ether solubilizes the metal hydride, and this facilitates contacting the reactants. In the second reaction of the sequence, an ether need not be employed. In other words, good results are obtained in the absence of an ether, and, when a reaction medium such as a hydrocarbon, or an excess of the tertiary amine is utilized. This suggests adding at least one mole portion of tertiary amine to the process of the first reaction. In this alternate method, one can employ a hydrocarbon such as toluene as the reaction medium thereby eliminating the ether. Elimination of the ether has significant advantages. It eliminates potential fire and explosion hazards that can exist with sodium aluminum hydride/ ether mixtures in the event that safe reaction temperatures are inadvertently exceeded. Also, ethers can be cleaved under the reaction conditions employed, and elimination of the ether removes this undesirable process complication. When one mole portion of tertiary amine is used as a reactant in the first reaction, the amount of tertiary amine used as a reactant in the second reaction can be decreased by one mole portion.

The amine alane co-products produced by this invention have all the utilities known for amine alanes. A particular utility of high interest is the preparation of silane by the reaction of the amine alane with SiF$_4$. This preparation of silane can be conducted on a reaction mixture produced by either of the above-described one-step, and two-step embodiments of this invention. Without being bound by any theory, it is believed this sequence of reactions can be illustrated by the following reaction sequence:

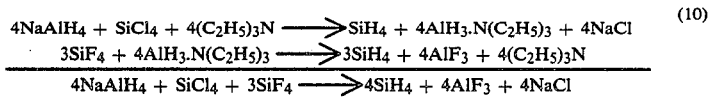

(10)

The discovery of this reaction sequence has made several important advantages available. Chief among these are the features given below. For example, it will be noted that the amine used as a reactant in the first step is liberated in the second. In theory at least, this nets out to no consumption of amine in the overall process. Of course, in actual practice, operation is not so clean cut; there can be some complications due to difficulty in separations, handling losses, and the like, which result in some consumption of amine. The process results in AlF$_3$ being produced in non-complexed form. This is an important feature of the invention since uncomplexed AlF$_3$ is a valuable article of commerce. Here again, operation may not be as clean cut as theory would indicate. Therefore, it can be necessary to free the AlF$_3$ product produced by this invention from some complex formed in the process. The NaCl by-product is a readily disposable form of sodium values that are commercially unattractive. The process of this invention can be conducted in a hydrocarbon medium. This is an advantage, because there are fire and explosive hazards associated with mixtures of some ethers and silane, and mixtures of some ethers and sodium aluminum hydride when safe temperatures are exceeded. The NaCl and AlF$_3$ products are produced at different stages of the sequential process. This can facilitate separation of these solids.

As taught above, this invention comprises reacting a metal hydride MAlH$_4$ and, all three compounds, LiAlH$_4$, NaAlH$_4$ and KAlH$_4$ can be used. In commerce, KAlH$_4$ is not readily available at this time, hence the LiAlH$_4$ and NaAlH$_4$ are preferred. The sodium compound is much cheaper than the lithium analog LiAlH$_4$, hence NaAlH$_4$ is more preferred. It can be used admixed with a hydrocarbon or dissolved in some substance such as DME, for example. The compound Na$_3$AlH$_6$ can be used in this invention in a manner analogous to NaAlH$_4$. Thus, its reaction with a silicon halide such as SiCl$_4$, and a tertiary amine such as triethylamine (to produce silane and an amine alane) is considered an embodiment of this invention.

In the process of this invention illustrated by Equation (8), SiCl$_4$ is a preferred source of silicon. Other materials can also be used in this process; e.g. SiBr$_4$, SiI$_4$, Si$_2$Cl$_6$ and the like. Their use in this manner is considered an embodiment of this invention.

This invention is conducted using a tertiary amine that forms an amine alane by complexing with aluminum hydride, $AlH_3$. For purposes of describing this invention, the amines that are employed are referred to herein as "complexing tertiary amines". Suitable complexing tertiary amines which may be utilized in the invention are liquids or low melting solids and include tertiary aryl, cycloalkyl, alkyl, alkenyl and aralkyl amines, including monoamines, diamines, triamines, etc. Typically, the amines of the present invention may be tetramethylethylenediamine, diphenylmethylamine, triethylenediamine, phenylmethylethylamine, tricyclohexylamine, or mixtures thereof, and other similar compounds. A more preferred class of amines for use in the invention are aliphatic tertiary amines, which include trialkylamine and trialkenylamine. Further, these amines may generally contain up to about 30 carbon atoms each, and preferably contain alkyl and alkenyl groups each having from 1 to about 10 carbon atoms. Thus, useful amines of this class are tri-n-butylamine; tri-sec-butylamine; dibutylpentylamine; tri-tert-butylamine; n-butyl-n-octyl-sec-butylamine; tripentylamine; trihexylamine; trihexenylamine; trioctadecylamine; didecenylpentylamine; tridecenylamine; and the like, as well as mixtures thereof. A most preferred class of amines for use in the invention are those lower alkyl amines such as trimethylamine, triisopropylamine, and particularly, triethylamine. By the term "lower" is meant that the alkyl groups each contain 6 carbon atoms or less. The above compounds may be readily prepared by procedures well known to those skilled in the art. Products of the present invention are these amines complexed with aluminum hydride.

Also usable complexing amines are the tertiary polyamines such as N,N,N',N'-tetramethylethylenediamine and 1,4-diazabicyclo[2.2.2]octane. Other tertiary mono- and polyamines are suitable, such as tri-n-propylamine, triisopropylamine, ethyldimethylamine, diethylmethylamine, tributylamine, dimethylpropylamine, N,N,N,',N'-tetramethyldiaminomethane, quinuclidine, methyl-1,4-diazabicyclo[2.2.2]octane, etc.

As indicated above the complexing amines usable with the invention include the trialkylamines especially tri-loweralkylamines such as trimethylamine and triethylamine. Trimethylamine is a gas at room temperature and is therefore more difficult to use in some of the preparations of amine alane. When it is intended to conduct the process of this invention according to sequence (10) it should be borne in mind that trimethylamine forms a stronger complex than triethylamine with $AlF_3$ co-product such that it is more difficult to free the $AlF_3$ without somewhat longer, high temperature heating and without some undesirable cleavage reactions occurring.

Triethylamine is the most preferred complexing tertiary amine of the invention. It forms a weak complex with the $AlF_3$ co-product such that less amine is complexed therewith and moderate heating affords vaporization of the amine.

The raw materials that react in the process of this invention combine in certain relative molar amounts. The preferred relative quantities are given in the equations above. Thus, for the one-step process of this invention illustrated by equation (8) it is preferred that the process be conducted using the relative molar proportions given below:

| REACTANT | MOLES |
| --- | --- |
| $MAlH_4$ | 4 |
| $SiCl_4$ | 1 |
| Tertiary amine | 4 |

For the two-step process illustrated by sequence (9), it is preferred that the process be conducted using the molar proportions:

| REACTANT | MOLES | |
| --- | --- | --- |
| | FIRST STEP | SECOND STEP |
| $MAlH_4$ | 1 | 3 |
| $SiCl_4$ | 1 | — |
| tertiary amine | — | 4 |

When the process of this invention is conducted in a manner which comprises reaction sequence (10), the first reaction of that sequence is conducted using the one-step or two-step method referred to above. Then, the amine alane product is preferably reacted with $SiF_4$, such that a 3-mole portion of $SiF_4$ is reacted with a 4-mole portion of the previously produced amine alane.

A skilled practitioner will readily appreciate that it is not necessary to conduct the various processes of this invention using exactly the mole ratios set forth in the tables and equations above. For example, the processes can be conducted while approximating these ratios. Alternatively, one may use an appreciable excess of one or more reactants. For example, an excess of the amine—if the amine is a liquid—can be used as a reaction medium.

In light of the above, a skilled practitioner will appreciate that the molar ratio employed is an important, but not a critical feature of this invention. In general, it is usually desirable to carry out the invention in an economical manner. Therefore, it will usually be desirable to use the reactants in a manner such that they are not wasted. Furthermore, in most instances they should be used in amounts that do not unduly encumber product recovery and separation. Excessive quantities of starting materials can waste them, and might make product recovery unduly complicated. Therefore, in many instances the mole ratios given above, or close approximations will be used. The process is preferably conducted using the starting material $MAlH_4$ as the limiting reactant.

In the various reactions that are embodied within this invention, use of a liquid reaction medium is normally preferred. Liquid media facilitate contacting the reactants. A liquid aids the mixing and contacting of reactants even when the reactants are not appreciably soluble in the liquid medium. Ethers, hydrocarbons and amines illustrate the types of materials that can be used as liquid reaction media in this invention. Suitable amines are exemplified by those mentioned above.

A wide variety of liquid hydrocarbons can be used as reaction media in this invention. Aromatic hydrocarbons are a preferred class of liquid reaction media and toluene is highly preferred.

Other useful aromatic hydrocarbons are benzene, ethylbenzene, propylbenzene, butylbenzene, meta-xylene, para-xylene, ortho-xylene, 1,2-diethylbenzene, 1,3-diethylbenzene, 1,4-diethylbenzene, 1,3-dipropylbenzene, 3-propyltoluene, 4-ethyltoluene, 4-propyltoluene, 4-butyltoluene, the trimethylbenzenes, and trialkylbenzenes generally. Also suitable are liquid polycyclic aromatic hydrocarbons such as 1-methylnaphthalene, tetrahydronaphthalene, and the like.

Another class of hydrocarbon reaction medium usable with the invention include the alkanes such as pentane, hexane, heptane, octane, nonane, decane, undecane, dodecane, and the like.

Ethers comprise another class of preferred reaction media for this invention. The liquid media of the invention includes the polyethers such as the dimethyl ether of diethylene glycol (diglyme), the dimethyl ether of ethylene glycol (monoglyme), the dimethyl ether of triethylene glycol (triglyme), the dimethyl ether of tetraethylene glycol (tetraglyme), 1,4-dioxane, aromatic ethers including diethyl ether and diphenyl ether, and the like.

The preferred ethers are the polyethers. These include 1,4-dioxane, 1,3-dioxolane, the diethyl ether of ethylene glycol, the dimethyl ether of ethylene glycol, the dimethyl ether of propylene glycol, the dimethyl ether of diethylene glycol, and the like.

A more preferred class of ether is the di-loweralkyl ethers of alkylene glycols. These include the diethyl ether of ethylene glycol, the dimethyl ether of propylene glycol, the dimethyl ether of diethylene glycol, and the like.

Still more preferred are the di-loweralkyl ethers of ethylene glycols. These include the dimethyl ether of ethylene glycol, the dimethyl ether of diethylene glycol, the dimethyl ether of triethylene glycol, the diethyl ether of diethylene glycol, and the like.

The polyethers and cyclic ethers are preferred classes of ethers. The polyethers include the preferred subclasses of di-loweralkyl ethers of alkylene glycols. These include diethyl ether of ethylene glycol, dimethyl ether of ethylene glycol (dimethoxyethane or glyme), the dimethyl ether of propylene glycol, the dimethyl ether of diethylene glycol (diglyme), the dimethyl ether of triethylene glycol, and the like. The diethyl ether of ethylene glycol is an advantageous reaction medium because the normal ether cleavage attributable to solvent attack does not produce methane. The dimethyl ether of ethylene glycol is the most preferred inert liquid reaction medium.

The cyclic ethers include 1,4-dioxane, the 1,3-dioxolanes, tetrahydrofuran, and the like. Tetrahydrofuran is a preferred inert liquid reaction medium of this type.

Although use of an inert liquid reaction medium is preferred, it is not a critical feature of this invention. As appreciated by a skilled practitioner, the use of a reaction liquid facilitates contacting the reactants as well as the operations of transferring the reaction mass, and the separation of products therefrom. For these purposes inert liquid reaction media that are relatively inexpensive are preferred. Other factors in choice of the liquid include solubility of the reactants, complexing ability, ease of decomplexation, resistance to cleavage, boiling point, level of toxicity, etc.

Applicants' invention is very useful for the production of silane. From the above discussion it can be seen that silane is produced in this invention by a number of ways. For example, it can be made by reacting equimolar amounts of an alkali metal aluminum tetrahydride with $SiCl_4$ as a first step in the two-step process; this is exemplified by sequence (9). Alternatively, it can be made by the one-step process exemplified by equation (8). Furthermore, additional silane can be made by the sequential process illustrated by sequence (10). With regard to the relative utility of $SiCl_4$ and $SiF_4$, it is to be understood that $SiCl_4$ is preferred in the processes exemplified by (8) and (9) for reasons of superior reactivity and increased yield. On the other hand, the use of $SiF_4$ is preferred in the process exemplified by the second reaction of sequence (10) since $AlF_3$ is a more desirable co-product than $AlCl_3$.

In this connection, tertiary amines do tend to complex to some extent with the aluminum trifluoride and completely with aluminum trichloride co-product formed by reacting an amine alane with $SiF_4$ or $SiCl_4$. Nevertheless as pointed out above, tertiary amines can be successfully employed as "inert" reaction media or reaction diluents, the term "inert" being employed herein to signify that the reaction medium does not interfere with the desired reaction (e.g., the production of silane and aluminum fluoride co-product) even though the medium or diluent may tend to undergo complexation with the aluminum fluoride co-product. Naturally the medium selected should not form complexes with the aluminum fluoride which cannot be readily decomposed to form aluminum trifluoride and the free medium.

The product yields and degree of difficulty to free the amine from the $AlF_3$ may vary somewhat from amine to amine but in general the tertiary amines are usable in the process to form the $AlH_3$ complex and, if liquid under the reaction conditions used, as liquid reaction media as well. When a tertiary amine is employed as the sole liquid inert reaction medium it will of course be present in quantity in excess of that required to complex with the aluminum hydride present in the system. Mixtures of tertiary amines with hydrocarbons (e.g., toluene, xylene, mesitylene, ethylbenzene, etc.) or with ethers (e.g., dimethyl ether, diethyl ether, dioxane, tetrahydrofuran, etc.) are also suitable inert media.

The $AlF_3$ co-product is readily separated from the complexed amine by heating. Preferably an inert gas such as helium, hydrogen, argon, nitrogen, etc. is swept over the solid co-product while heating to direct the amine to a suitable condensation system, such as a condenser or trap where it may be recovered and, if desired, recycled. When the complexed amine is triethylamine, heating vaporizes the amine very well. At 95° C. the triethylamine complex is not significantly affected; at 200° C., a small fraction of the amine is freed after a short time; at 250° C., more than one-half the amine is eliminated and at 300° C. or higher substantially all the amine is separated from the $AlF_3$ co-product.

Alternatively, the aluminum trifluoride co-product may be heated under reduced pressure whereby the liberated tertiary amine can be readily separated from the residual aluminum trifluoride product.

If a sweep gas or vacuum (reduced pressure) is not used, amine degradation may occur during heating of the $AlF_3$ co-product.

Other methods may be used to separate the amine from the aluminum trifluoride co-product. For example, use of aqueous HF followed by ethanol extraction reduced the content of complexed $Et_3N$ in the $AlF_3$ product from 20 to 12 percent. Concentrated HCl followed by $CHCl_3$ extraction also lowered the amine content. At $HCl/Et_3N$ ratios of 1, 2, and 3 the amine retained was lowered from 20 to 17, 7, and 4 percent, respectively. Ethanol containing one equivalent of HBr reduced $Et_3N$ from 20 to 4 percent, but some of the co-product $AlF_3$ also reacted with the alcohol.

When $NaAlH_4$ is used to prepare the complexed amine alane, a relatively pure source is desirable especially where trace metals are present. The NaAlH$_4$ is preferably recrystallized if the NaAlH$_4$ is prepared from aluminum containing; e.g., 1900 ppm titanium. Otherwise, autodecomposition of the alane may occur if the crude mixture is heated or allowed to stand for long periods. Crude NaAlH$_4$ can be used successfully if the product solution of AlH$_3$.NR$_3$ is filtered from the by-product salts and other impurities.

The reaction mixtures of the invention are often gel-like in appearance, but agitation and filtration of the slurries are relatively easy.

The reaction variables, temperature, pressure, and reaction time are not critical in this invention. In general a skilled practitioner will select a set of variables which affords an acceptable product yield in a reasonable reaction time, without an untoward amount of undesired side reactions. The variables selected will in some way or ways reflect the process ingredients employed. For example, if trimethylamine is used as a reactant, the reaction can be conducted at somewhat elevated pressure to facilitate contacting this amine with the other materials in the reaction mixture. If a starting material is somewhat temperature sensitive, a low to mild temperature can help diminish decomposition of the sensitive substance. If the reaction kinetics are slow, a longer reaction time can be used to increase reaction yields.

The set of reaction parameters employed can be determined by a skilled practitioner without an undue amount of experimentation using the skill of the art and the teachings within this specification.

The silane-forming reactions of this process, i.e. the reactions illustrated by
 (a) equation (8)
 (b) the first equation in sequence (9), and
 (c) the second equation in sequence (10) as well as the amine alane formation reaction illustrated by the second equation of sequence (9) can be conducted over a wide range of temperatures. A suitable temperature range is about 0° to about 80° C. and a preferred range is about 5° C. to about 60° C. These reactions can be conducted at atmospheric, subatmospheric or super-atmospheric pressures. In general, atmospheric pressure is suitable when using reactants that are solids or liquids at reaction temperatures. A preferred pressure range is 1 to 100 atmospheres, more preferably 1 to 20 atmospheres. The reaction time is not a truly independent variable but is dependent at least to some extent on the other reaction conditions employed. Generally, each of the silane-forming reactions is conducted in a time of from 0.25 to 24 hours, preferably from about 1 to about 8 hours.

For teachings of the reaction conditions efficaciously employed (when conducting the process exemplified by the second equation in sequence (10)), reference is made to U.S. Pat. No. 4,474,743 supra which pertains to that process. That patent is incorporated by reference herein as if fully set forth.

EXAMPLE I

To a 50-mL, 3-neck flask was added:
 0.15 gram NaAlH$_4$ (92% pure, 0.0025 mole)
 4.1 g triethylamine (0.04 mole)
 5 5 g dimethoxyethane (DME)
To a 25-mL funnel was added 0.43 gram SiCl$_4$ (99%, 0.0025 mole); and 5.5 grams of dimethoxyethane. The funnel and flask were connected and the flask fitted with a suitable train for collection and measurement of the silane produced. The SiCl$_4$/DME mixture was added to the flask dropwise over a 15-minute period. The flask was swept with H$_2$ for 30 minutes. The condensables (including SiH$_4$) collected in a liquid nitrogen trap within the train attached to the flask were measured: initial pressure=0, final pressure = 122 mm Hg at 25° C. The volume of gas was 291 cc.

The number of moles of silane was calculated by the relationship obtained by rearranging the equation PV=nRT:

$$n = \frac{122 \times 0.291}{62.36 \times 298} = 0.0019 \text{ mole. (Theory is 0.0025 mole).}$$

The flask was charged with 0.44 gram of NaAlH$_4$ (92%; 0.0075 mole) and the mixture stirred at room temperature for two hours. Then mixture was then filtered and the slightly cloudy filtrate placed into a 50-mL, 3-neck, round bottom flask. After attachment to the gas collection train, SiF$_4$ was added for 20 minutes at 23°-24° C. From the pressure drop in the SiF$_4$ vessel it was determined that 0.0071 mole of SiF$_4$ was added. The silane from the liquid nitrogen trap was expanded into a calibrated chamber of the gas collection train, and the pressure developed was 450 mm Hg at 25° C. The volume of gaseous product was 294 cc. Gas chromatographic/mass spectrometric (GC/MS) analysis of the gaseous product showed only SiH$_4$. Hence the amount of silane produced was:

$$n = \frac{450 \times 0.294}{62.36 \times 298} = 0.0071 \text{ mole}$$

The reaction residue was stripped of DME and excess triethylamine at 90°-95° C. and 2 mm Hg. A white powdery residue, 1.10 grams, was obtained. (Theory for AlF$_3$ is 0.80 gram Overall yield is (25×0.76)+(75×1.00) or 94%.

Analysis of the solids also showed 4.1% Na, and 20.7% Al, which is a Na/Al ratio of 1/4.3. This represents 10.4% NaF and 89.6% AlF$_3$ (normalized).

The procedure of this example can be repeated using LiAlH$_4$ or KAlH$_4$ in place of the NaAlH$_4$ employed. Similar results are obtained.

The procedure of the above example can also be repeated using, in place of triethylamine, trimethylamine, tri-n-propylamine, tri-n-butylamine, N,N,N',N'-tetramethylethylenediamine.

EXAMPLE II

In this example, the same reaction sequence as in the previous example, is carried out. However, toluene is used in place of DME. To a 50-mL, 3-neck flask was added:
 0.62 gram NaAlH$_4$ (92%; 0.0105 mole)
 11.0 grams toluene, and
 4.1 grams triethylamine (0.04 mole).
To a 25-mL funnel was added:
 0.43 gram SiCl$_4$ (0.0025 mole), and
 4.0 grams toluene.
The SiCl$_4$/toluene mixture was dripped into the flask over a 10 minute period at 25° C. Some solid SiCl$_4$ NEt$_3$ was noted at the top of the flask, hence all the SiCl$_4$ may not have gotten into the resultant reaction mixture. The mixture was stirred for 55 minutes after completion of the addition. Collection and analysis of silane as in the previous example showed a yield of 67.5%.

The residue was stirred at room temperature for 115 minutes after addition of the SiCl$_4$ was complete, and then filtered to give a water white filtrate. The filtrate was placed in another 50-mL, 3-neck, round bottom flask for reaction with SiF$_4$.

The amount of SiF$_4$ added was 0.0064 mole. The condensed SiH$_4$ produced was measured as before, and calculation indicated that the silane produced was 0.0045 mole. Analysis by GS/MS indicated it was contaminated with 1.4% SiF$_4$. Hence the yield of SiH$_4$ produced from SiF$_4$ was:

$$\frac{0.0045}{0.0064} \times (1.0 - 0.014) = 69\%$$

The overall SiH$_4$ yield was $(25 \times 0.675) + (75 \times 0.69) = 68.7\%$.

The residue from this reaction was filtered and the filter cake washed with dry toluene. The cake (containing AlF$_3$) was dried for four hours at 105° C. and was then determined to weigh 1.08 grams.

The dried cake was placed in a U-tube and submerged in an oil bath at 340° C. while purging with hydrogen for 20 minutes. The decomplexed solid weighed 0.61 gram. (Theory is 0.49 g based on 0.0044 mole of SiH$_4$ and 0.72 g on 0.0064 mole of SiF$_4$.) The desolvated solid was submitted for sodium and aluminum analysis. The results were 0.12% Na and 32% Al. (Theory for AlF$_3$ is 32.1%).

These analytical results showed that the AlF$_3$ product obtained using toluene as a solvent is of better quality than that obtained from the process of Example I using DME as a solvent.

| AlF$_3$ By-Product Composition | | | | |
| --- | --- | --- | --- | --- |
| Example | Solvent | % Al | % Na | Al/Na (Atomic) |
| I | DME | 20.7 | 4.1 | 4.3/1 |
| II | Toluene | 32.0 | 0.12 | 228/1 |

The above reactions were repeated as follows:

to react with trimethylamine, tri-n-propylamine, tri-n-butylamine, tri-n-hexylamine, and the like using a reaction temperature of 5° C. to 80° C., a reaction pressure of 1 to 10 atmospheres, and a reaction time of 0.25 to 6.0 hours.

Other amines that can be made to react according to the process of the previous examples are:
triethylenediamine (Dabco),
N,N,N',N'-tetramethylethylenediamine,
N,N,N',N'-tetramethyldiaminomethane,
1,4 diazabicyclo[2.2.2]octane,
N-methylpyrrolidine,
2-methyltriethylethylenediamine, and quinuclidine.

COMPARATIVE EXAMPLE

To a 50-mL, 3-neck flask was added 0.56 gram of NaAlH$_4$ (recrystallized, 96%; 0.010 mole) and 9.00 grams of dimethoxyethane. To a dropping funnel was added 0.43 gram of SiCl$_4$ (Aldrich Chemical Co.; 0.0025 mole). The contents of the funnel were added to the flask over a 5-minute period and at a temperature of 33°–34° C. Stirring was continued with a nitrogen sweep for 33 minutes while maintaining the temperature at 33° C. Then, 0.0074 mole of SiF$_4$ was added to the reaction mixture over a 63-minute period at a temperature of 33°–35° C.

The gaseous product formed was measured as before. Analysis by GC/MS showed it to contain 65% SiH$_4$, 33% CH$_4$, and 2% (CH$_3$)$_2$SiH$_2$. The yield of silane was 59%.

The large amount of methane produced indicates cleavage of the dimethoxyethane possibly by a ClAlH species intermediate in the formation of the AlH$_3$.etherate.

The residue, with some dark powder (aluminum?) present, was stripped of liquid at 70° C. and 2 mm Hg pressure. The solid was taken up in 30-mL of distilled water and warmed with stirring at 60° C. for one hour. The white slurry was rather gelatinous. It was filtered, water-washed and dried overnight at 105° C. The dried, white cake weighed 0.78 g; theory for AlF$_3$ is 0.83 g. The sodium:aluminum ratio in the product was about 1:1, showing the product was not AlF$_3$.

|  | Example III | Example IV | Example V |
| --- | --- | --- | --- |
| Charge to 3-neck flask | (50-mL flask) | (100-mL flask) | (100-mL flask) |
|  | 0.62 g NaAlH$_4$ (92%) | 4.81 g NaAlH$_4$ (92%) | 4.81 g NaAlH$_4$ (92%) |
|  | 8.00 g toluene (dry) | 22.4 g toluene (dry) | 22.4 g toluene (dry) |
|  | 1.06 g Et$_3$N | 8.2 g Et$_3$N | 8.2 g Et$_3$N |
| Charge to funnel | 0.43 g SiCl$_4$ (97% pure) | 3.50 g SiCl$_4$ (97% pure) | 3.50 g SiCl$_4$ (97% pure) |
|  | 7.00 g toluene (dry) | 15.0 g toluene (dry) | 15.0 g toluene (dry) |
| Time of addition of funnel contents to flask | 2 minutes | 10 minutes | 5 minutes |
| Temperature during addition | 33° C. | 10° C. | 12° C. |
| stirring after addition | 3 hours (25–32° C.) | 3 hours (29–33° C.) | 2 hours & 10 minutes (30–35° C., one excursion to 40° C.) |
| SiH$_4$ yield | 100% (0.0028 mole) | Silane swept and not trapped. | 92% (0.0184 mole) |
| SiF$_4$ added to residue | 0.0075 mole | — | — |
| SiH$_4$ yield | 60% (0.0045 mole) | — | — |
| Note: | Lower yield obtained in SiF$_4$ reaction due to accidental addition of drop of water to residue during transfer and incomplete transfer. | AlH$_3$.NEt$_3$ isolated in 90% yield based on active hydrogen, and 86% based on Al. | AlH$_3$.NEt$_3$ isolated in 95% yield based on active hydrogen and 89% based on Al. |

In the process of the above examples, lithium aluminum hydride (LiAlH$_4$) and potassium aluminum hydride (KAlH$_4$) can be used in place of sodium aluminum hydride (NaAlH$_4$). These metal hydrides can be made The process of the above example demonstrates the advantage of using an amine in the reaction system.

Without an amine, the reaction can, as shown above, lead to an unacceptable amount of cleavage of an ether reaction medium used to dissolve the aluminum hydride reactant.

In contrast to the process of the comparative example, the process of this invention can be operated (as shown by the previous examples above) to produce $AlF_3$ as a co-product. In view of the commercial value of aluminum trifluoride, this is an important feature of the invention. Another important feature of the invention is that (although ethers can be used as reaction media) the process does not require use of ethers. When cleavable ether solvents are avoided, gaseous hydrocarbon by-products are avoided and solvent recovery is better. Furthermore, as indicated above, in the process of this invention sodium can be removed as sodium chloride. This is another important feature of the invention.

While preferred embodiments have been described in detail above, various aspects of the invention may be altered without departing from the scope or spirit of the invention as defined by the appended claims.

We claim:

1. Process for the preparation of silane and a tertiary amine alane, said process comprising reacting:
   (a) an alkali metal aluminum tetrahydride having the formula $MAlH_4$, wherein M is an alkali metal selected from the class consisting of lithium, sodium and potassium,
   (b) silicon tetrachloride, and
   (c) a complexing tertiary amine, such that the molar proportion of (a) to (b) to (c) is about 4:1:4.

2. A process of claim 1 conducted in the presence of a liquid reaction medium selected from ethers, hydrocarbons and tertiary amines.

3. The process of claim 2 being conducted in the presence of an inert hydrocarbon reaction medium.

4. The process of claim 3 wherein said hydrocarbon reaction medium is toluene.

5. The process of claim 1 wherein said tetrahydride is sodium aluminum tetrahydride, $NaAlH_4$.

6. Process for the formation of silane and triethylamine alane, said process comprising reacting $NaAlH_4$, $SiCl_4$ and $(C_2H_5)_3N$ in a mole ratio of about 4:1:4.

7. The process of claim 6 being conducted in the presence of toluene as a liquid reaction medium, and at a temperature of from about 5° C. to about 80° C.

8. The process of claim 1 being conducted in stages as follows:

STAGE (1): reacting substantially equimolar portions of an alkali metal aluminum tetrahydride and silicon tetrachloride in the presence of a liquid reaction medium to produce silane and a residual mixture,
   STAGE (2): reacting the residual mixture thereby produced with about 3 additional moles of alkali metal aluminum tetrahydride and about 4 moles of complexing tertiary amine to produce the tertiary amine alane and an alkali metal halide co-product.

9. The process of claim 8 wherein said metal aluminum tetrahydride is $NaAlH_4$.

10. The process of claim 8 wherein said tertiary amine is triethylamine.

11. Process for the preparation of silane and aluminum trifluoride, said process comprising:
    (STEP 1.) conducting the process of claim 1 and recovering silane and a residual reaction mixture containing metal halide and amine alane co-products, separating metal halide co-product therefrom, and
    (STEP 2.) reacting the amine alane co-product in the metal halide-free reaction mixture thereby produced with silicon tetrafluoride, such that the molar ratio of said tetrafluoride to said alane is about 3:4, thereby producing (a) additional silane and (b) aluminum trifluoride co-product both STEPS being conducted in the presence of a liquid hydrocarbon reaction medium and in the substantial absence of an ether.

12. Process of claim 10 wherein Step 1 is conducted using sodium aluminum hydride and triethylamine as reactants.

13. A one-step process for the preparation of silane and a tertiary amine alane, said process comprising reacting:
    (a) an alkali metal aluminum tetrahydride having the formula $MAlH_4$, wherein M is an alkali metal selected from the class consisting of lithium, sodium and potassium,
    (b) silicon tetrachloride, and
    (c) a complexing tertiary amine, such that the molar proportion of (a) to (b) to (c) is about 4:1:4; said process being conducted in the presence of a hydrocarbon liquid reaction medium and in the substantial absence of an ether.

14. The process of claim 13 wherein said hydrocarbon liquid reaction medium is toluene.

* * * * *

UNITED STATES PATENT AND TRADEMARK OFFICE
CERTIFICATE OF CORRECTION

PATENT NO. : 4,757,154

DATED : July 12, 1988

INVENTOR(S) : Everett M. Marlett and F. W. Frey

It is certified that error appears in the above-identified patent and that said Letters Patent is hereby corrected as shown below:

Column 2, line 5, reads "1985, teaches" and should read -- 1985, now U. S. 4,632,816, teaches --.

Column 7, line 13, reads "1,4-dioxane, aromatic" and should read -- 1,4-dioxane, the 1,3-dioxolanes, tetrahydrofuran (THF), simple aliphatic and --.

Column 9, line 64, reads "4.1 g" and should read -- 4.1 grams --.

Column 9, line 65, reads "5 5 g" and should read -- 5.5 grams --.

Column 10, line 16, reads "Then" and should read -- The --.

Column 10, line 39, reads "0.80 gram  Overall" and should read -- 0.80 gram.)  Overall --.

Column 10, lines 64 and 65, read "$SiCl_4$ $NEt_3$" and should read -- $SiCl_4 \cdot NEt_3$ --.

Signed and Sealed this

Seventeenth Day of January, 1989

Attest:

DONALD J. QUIGG

Attesting Officer

Commissioner of Patents and Trademarks